United States Patent [19]

Cattoen et al.

[11] Patent Number: 5,445,021
[45] Date of Patent: Aug. 29, 1995

[54] METHOD AND DEVICE FOR ASSISTANCE IN PILOTING AN AERODYNE BY THE GRAPHIC REPRESENTATION OF THE VERTICAL FLIGHT PLAN OF THIS AERODYNE

[75] Inventors: Thierry Cattoen, Leguevin; Daniel Duturc, Colomiers; Mariannick Vaquier, Limours, all of France

[73] Assignees: Societe Nationale Industrielle et Aerospatiale, Paris; Sextant Avionique, Meudon la Foret, both of France

[21] Appl. No.: 266,118

[22] Filed: Jun. 27, 1994

Related U.S. Application Data

[63] Continuation of Ser. No. 37,434, Mar. 26, 1993, abandoned.

[30] Foreign Application Priority Data

Mar. 26, 1992 [FR] France ................. 92 03643

[51] Int. Cl.$^6$ ................. G01C 21/00; A47B 97/04
[52] U.S. Cl. ................. 73/178 R; 364/448; 244/186
[58] Field of Search ............ 73/178 R; 340/973, 990, 340/995; 364/433, 443, 444, 448; 244/186

[56] References Cited

U.S. PATENT DOCUMENTS

| | | | |
|---|---|---|---|
| 4,792,906 | 12/1988 | King et al. | 364/448 |
| 4,825,374 | 4/1989 | King et al. | 73/178 R |

FOREIGN PATENT DOCUMENTS

| | | |
|---|---|---|
| 0257702 | 3/1988 | European Pat. Off. . |
| 2334141 | 7/1977 | France . |
| 3434632 | 4/1986 | Germany . |

*Primary Examiner*—Richard E. Chilcot, Jr.
*Assistant Examiner*—William L. Oen
*Attorney, Agent, or Firm*—Browdy and Neimark

[57] ABSTRACT

The piloting assistance method embodying the invention consists in displaying on a screen of the cockpit of the aerodyne, in a Cartesian reference space representing altitude/distance from ground along a horizontal plane, way points identified by a series of marks, plural way points, a reference vertical profile connecting the way points by connecting lines and altitude constraint symbols indicating a minimum altitude at which the aerodyne can pass, a maximum altitude at which the aerodyne can pass and an altitude at which the aerodyne must necessarily pass, a symbol indicating the position of the aerodyne. The invention enables the pilot to have a clear vision of the vertical situation of the aerodyne along its flight plan.

8 Claims, 4 Drawing Sheets

METHOD AND DEVICE FOR ASSISTANCE IN PILOTING AN AERODYNE BY THE GRAPHIC REPRESENTATION OF THE VERTICAL FLIGHT PLAN OF THIS AERODYNE

This application is a continuation of U.S. patent application Ser. No. 08/037,434, filed Mar. 26, 1993 now abandoned.

BACKGROUND OF THE INVENTION

1. Field of the Invention

This invention relates to a method and device for assistance in piloting an aerodyne by the graphic representation of the vertical flight plan of this aerodyne.

2. Description of the Prior Art

In aerodynes of modern design, the flight plans are generated by a flight management system which dialogues with the pilot. This is accomplished by means of at least the two following interfaces:

a visualization screen on which is represented the plotting of the aircraft's route drawn on a horizontal plane (horizontal projection) from way points that the pilot has selected during preparation of his flight;

a keyboard/screen console called MCDU (Multipurpose Control and Display Unit) which enables dialogue between the flight management system and the pilot. This console permits the pilot to key in the singular points defining the flight plan and subsequently, to modify the flight plan when required.

The plotted horizontal flight plan is sometimes associated with certain information concerning the vertical profile (ground distance, altitude) but only in the form of symbols or inscriptions. However, these symbols do not enable the pilot to easily create a mental image of the situation in the vertical plane, as would a diagram.

With the MCDU, the information relating to the vertical flight plan is available on the screen in the form of a table providing e.g. the altitude, speed, predicted time of passage at each point and the distance from one way point to another. It is clear that this method of alphanumeric presentation of a trajectory does not enable the pilot to have a clear vision of the vertical situation of the aerodyne along its flight plan.

OBJECT OF THE INVENTION

The object of the invention is therefore notably to obviate this drawback.

SUMMARY OF THE INVENTION

The invention proposes a method which comprises a step of displaying on a visualization screen, in an altitude/ground distance reference system, at least the following elements:

plural way points which can be identified by a series of marks on the horizontal ground axis and on the vertical altitude axis; and a reference vertical profile connecting said way points by connecting lines.

In addition, on at least one vertical line running through a way point, at least one of the following three altitude constraint symbols is displayed:

a first symbol indicating a point corresponding to a maximum altitude at which the aerodyne can pass;

a second symbol indicating a point corresponding to a minimum altitude at which the aerodyne can pass; and a third symbol indicating a point corresponding to an altitude range at which the aerodyne must necessarily pass.

This representation of the vertical flight plan can take up the entire screen or simply a window of variable dimensions provided in the latter.

The above mentioned method can also comprise, in addition to the said altitude constraint symbols, a step of displaying speed information used by the pilot, such as speed objectives and speed constraints.

The speed objective is changed for another one being indicated on the line by a speed change symbol.

Speed constraints or limits are situated at certain way points of the flight plan. These speed limits which are often imposed by air traffic control, make it necessary to pass at each of these points at a speed less than or equal to a given value. The limits are indicated in relation to a way point identified by a diamond on the line.

The method embodying the invention can further comprise the display of information relating to time constraints. This information consists in messages indicating a time of passage at a way point, this message being preferably indicated near the way point identification message.

The position of the aerodyne in relation to the line can of course be indicated on the screen.

The colours used can comply with regulations and conventions in force.

If, for any reason whatsoever, a planned constraint is not satisfied, the colouring of the display of this constraint can change to take on a colour indicating a warning. This display can then flash to prompt the pilot to take action to comply with this constraint.

BRIEF DESCRIPTION OF THE DRAWINGS

Embodiments of the method according to the invention will be described hereinafter, by way of non limiting examples, in reference to the accompanying drawings in which.

DESCRIPTION OF THE PREFERRED EMBODIMENTS

It should firstly be recalled that the information concerning the vertical flight plan is already available in certain current aircraft. They are in fact computed by the flight management system (FMS) of which the MCDU keyboard/screen constitutes the package for dialogue with the pilot.

The method embodying the invention proposes to visualize on a visualization screen, in addition to the lateral flight plan already available on this screen, a schematic representation of this information evoking the vertical trajectory of the aircraft.

Figure 1:
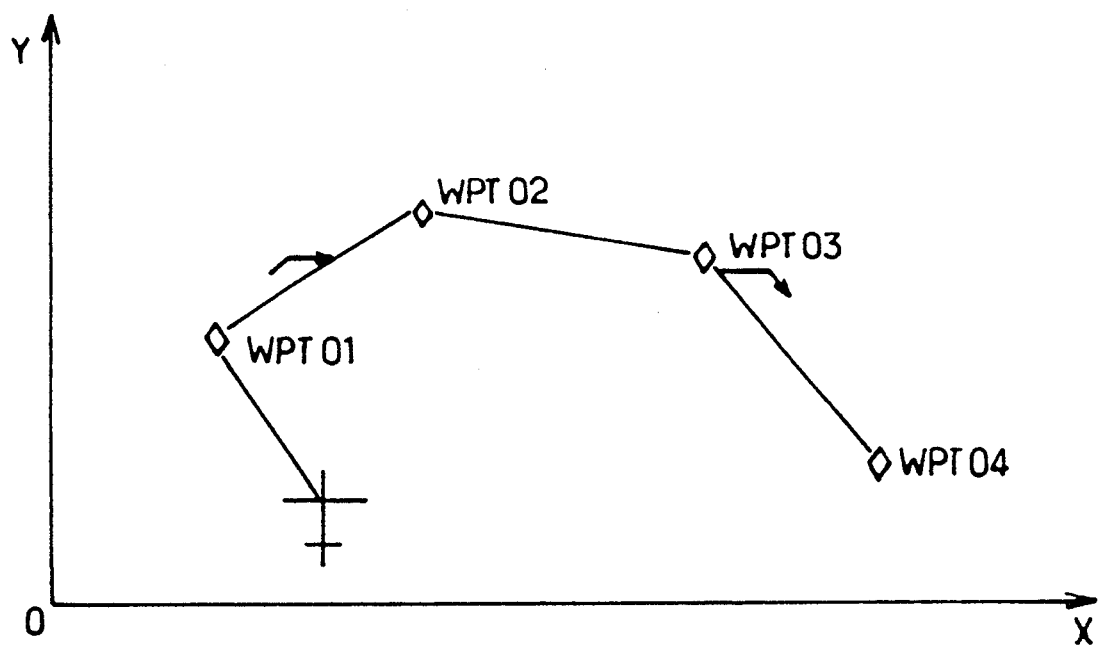
FIGS. 1 and 2 are modes of representation of a flight plan, in the horizontal plane (lateral flight plan) (FIG. 1) and in the vertical plane (FIG. 2) of an aircraft.

FIG. 1, shows a conventional lateral flight plan in a horizontal plane XOY. Also shown, in addition to the symbol representing the position of the the aircraft, is a succession of way points connected together by connecting lines. FIG. 1, also shows a first symbol designating the place where, upon completion of an ascent, the aircraft will be in level flight, and a second symbol indicating the place where, upon completion of the level flight, the aircraft will undertake a descent.

It is obvious that these symbols in the conventional lateral flight plan do not enable the pilot to easily create a mental image of the vertical trajectory of the aircraft.

Figure 2:
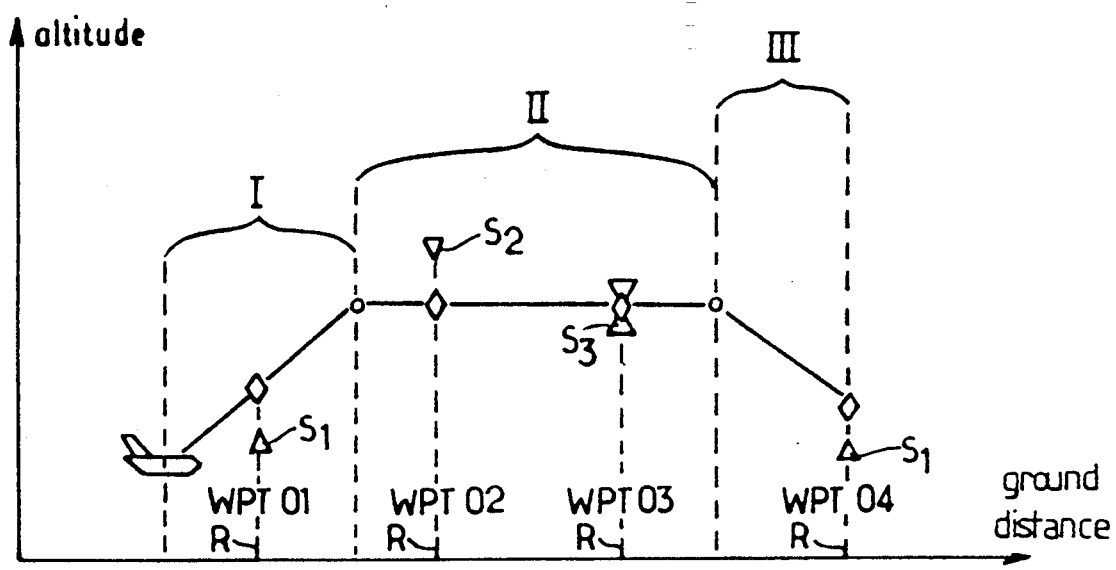

To obviate this drawback, the invention provides, on the screen, a graphic representation of the vertical flight plan comprising, as represented in FIG. 2, in a Cartesian reference system representing altitude/ground distance, a reference vertical profile comprising a succession of way points (WPT 01 to WPT 04). These way points correspond with those of FIG. 1 and are connected together by connecting lines.

Each way point is marked by a mark R indicating its vertical distance from ground axis and by an identification inscription.

In this example, the reference vertical trajectory of the aircraft comprises an ascending phase I, a level flight phase II and then a descending phase III. The passages from one of these phases to another, are indicated by dots.

The reference vertical trajectory is of course a theoretical trajectory which will only be followed approximately by the aircraft. It is for this reason that, with this trajectory are associated altitude constraint or limit symbols of three different types. Each constraint symbol is shown in FIG. 2 on a vertical line running through a way point.

The first symbol $S_1$ is a triangular index having a peak pointed upwards. This symbol, which is associated with way points WPT 01 and WPT 04, indicates the minimum altitude at which the aircraft can pass.

The second symbol $S_2$ is a triangular index having peak pointed downwards to indicate the maximum altitude at which the aircraft can pass. In this instance, the symbol is associated with way point WPT 02.

The third symbol $S_3$ is an index formed by two triangles opposed by a common vertex. This index indicates by means of its common vertex, the altitude at which the aircraft must necessarily pass.

In addition to the two dimensions (altitude/ground distance), the flight management system also displays information relating to a speed dimension.

The speed information of use to the pilot is of three orders, described as follows.

1) Speed objectives indicative in the short term of the current instructed speed, and in the longer term the next speed instruction.
2) Speed constraints or limits are imposed at certain way points of the flight plan by air traffic control. These limits require the aircraft to pass through these points at a value equal to or less than a given value. The constraints can either come from the data base of the flight management system, or from the information entered by the pilot (via the MCDU keyboard) when drawing up his flight plan at the request of air traffic control.
3) Predicted speeds at way points take into account the speed objectives and possibly the speed limit. The flight management system predicts at each way point of the flight plan the passing speed of the aircraft.

Figure 3:
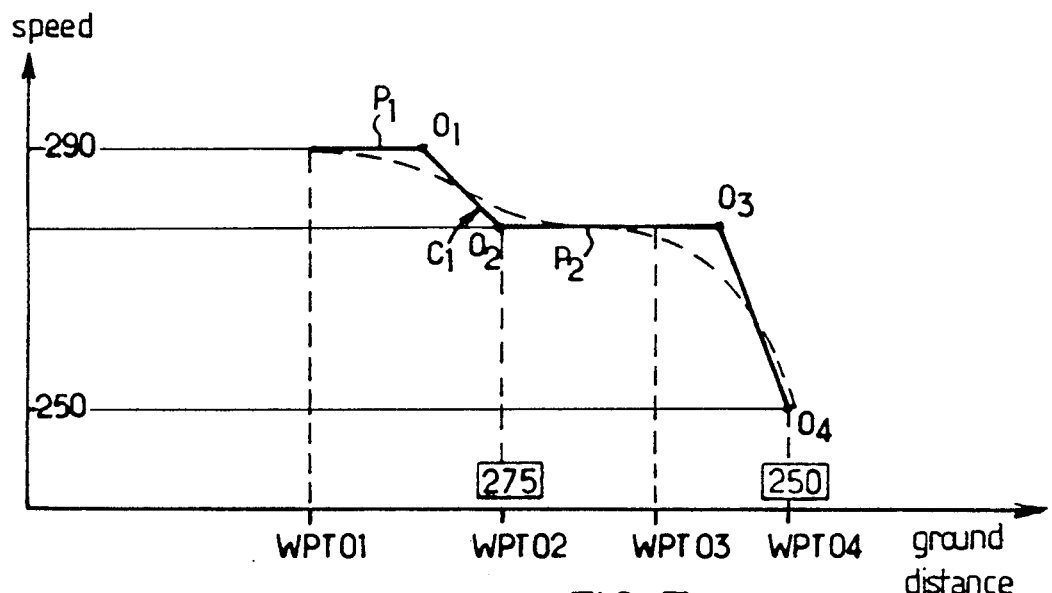
FIG. 3 is a diagram representing the ground speed of the aircraft as a function of altitude.
Figure 4:
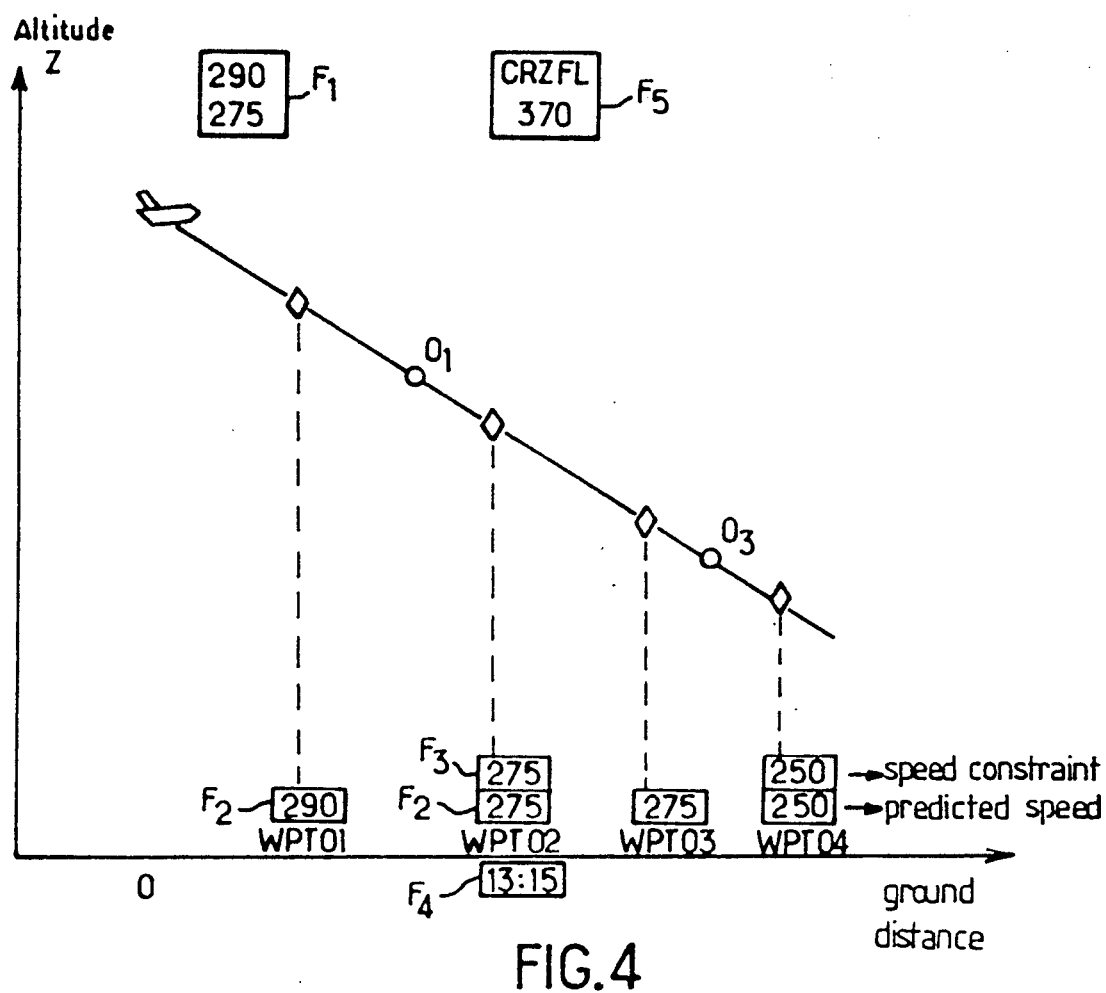
FIG. 4 is a representation of the vertical flight plan of the aircraft in which figure the speed constraints indicated in the diagram in FIG. 3.

FIG. 4 shows a mode of representation of the speed information in a vertical flight plan in relation to a speed instruction indicated on the speed/ground distance diagram represented in FIG. 3.

In the latter, the speed instruction, curve $C_1$, represented in full lines, comprises a first level flight stage $P_1$ at a constant speed of 290 knots. $P_1$ extends from the speed axis to a point $0_1$ which is situated between way points WPT 01 and WPT 02. At point $0_1$ a deceleration starts and ends at a point $0_2$. Point $0_2$ marks the start of a second level flight stage $P_2$ at a constant speed of 275 knots. This stage $P_2$ is continued up to point $0_3$ situated between way points WPT 03 and WPT 04 from which the speed decreases to reach 250 knots at way point WPT 04.

In this example minimum speed constraints at 275 and 250 knots are respectively associated with way points WPT 02 and WPT 04.

The vertical flight plan indicated in FIG. 4 comprises a succession of way points corresponding to those in FIG. 3 and similarly designated WPT 01 to WPT 04 by means of inscriptions figuring above the ground distance axis.

In this example, in the descending phase, the vertical profile of the flight plan is rectilinear and forms a slope heading towards the ground.

The speed information associated with this representation comprises:
a) an indication of the current value, i.e., 290 knots, and the next speed limit, i.e. 275 knots, in a window $F_1$ situated at the top of the screen,
b) an indication of the passing speed in windows $F_2$ situated above each way point designation,
c) an indication of the speed limit in windows $F_3$ situated above windows $F_2$ associated with way points WPT 02 and WPT 04, and
d) two symbols, in this instance circles $0_1$ and $0_3$, marking on the profile the places at which speed changes begin. These circles $0_1$ and $0_3$, which correspond to points $0_1$ and $0_3$, notably enable the pilot to be warned of automatic changes of speed and consecutive accelerations or decelerations.

The list of information displayed is not of course restrictive.

It is thus possible to indicate passage times and/or time constraints on the flight plan. The latter can be indicated by a message inscribed in window $F_4$ situated below the designation of the way points.

The method embodying the invention can further comprise the presentation of various information susceptible of helping the pilot manage the vertical trajectory.

Thus, in addition to the reference trajectory, the image produced on the screen can comprise the plotting of an optimal flight level computed by the flight management system according to a cost criterion. In the example illustrated in FIG. 4, the optimal flight level is indicated in a window $F_5$. A maximum flight level, which can evolve with the predicted lightening, may also be indicated to enable the pilot to see where he can initiate the changes in cruising level.

This image can also indicate transitional altitude, i.e., the altitude at which altitudes expressed in feet and relating to ground pressure on the day change to altitudes expressed in flight level (FL) and relating to standard pressure (1013 HPa at sea level and at a temperature of 15°).

Furthermore, the previously described mode of representation of the flight plan appears particularly well suited to the presentation of various information, notably including:

the gradient wind speeds in the terminal zone, which can be represented on the vertical profile of the flight plan by an appropriate symbol, the relief of the ground, particularly in the terminal zone, as well as in the case of engine failure where the aircraft is led to come close to mountainous areas. In this case, the visualization of the relief, associated with the prediction of the trajectory and with the maximum altitude of the aircraft, can be of appreciable assistance to the pilot. This relief information can come from a specific system for management of the relief and its vicinity (system called G-GAS)or more simply from the data base of the flight management system in which are stored maximum operational altitudes for various flight phases, and intruding aircraft situated in the vicinity of the flight plan line, in order to obtain a sort of anti-collision system (in the vertical plane).

Figure 5:
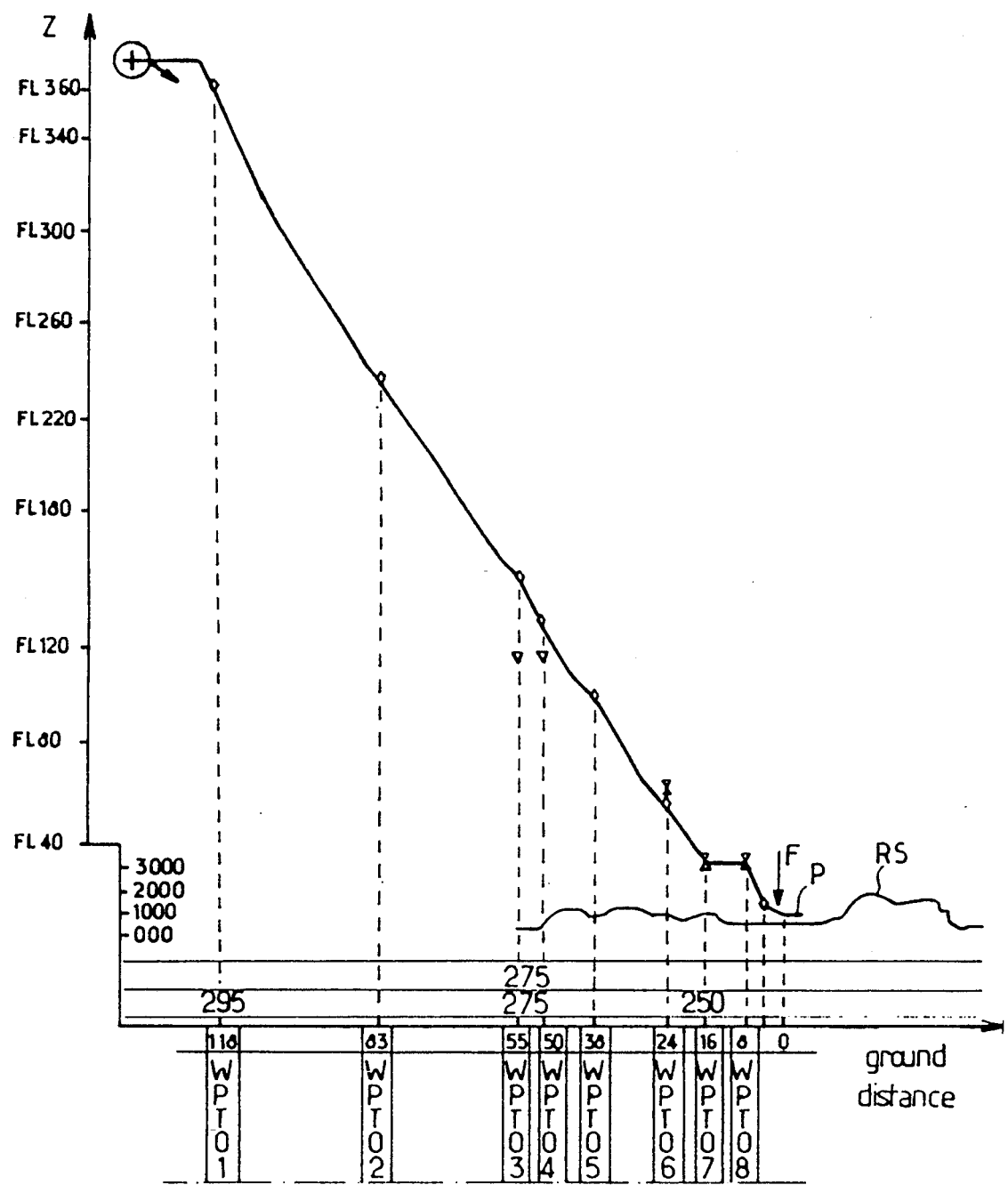
FIG. 5 is a representation of the reference vertical profile upon descent of an aircraft.

A schematic representation of the ground relief RS is indicated at the end of the descending phase illustrated by the vertical profile represented in FIG. 5.

In this figure, the reference vertical profile is marked out by way points WPT 01 to WPT 08.

In this example, the altitude decreases in a substantially linear manner as a function of the distance from ground from a level flight stage situated in excess of 37,000 feet to an altitude of approximately 3,000 feet, fixed by a constraint situated at way point WPT 07. Three altitude constraints are provided on this part of the descent profile. Two constraints fixing the minimum altitude at 12,000 feet at way points WPT 03 and WPT 04 and a constraint imposing an altitude of 6,000 feet at way point WPT 06.

After way point WPT 07, the profile forms a level flight stage imposed by the constraints associated with way points WPT 07 and WPT 08. After the latter way point, the profile marks a further descent to the landing runway P, passing through a way point that is not referenced.

Speed constraints of 275 and 250 knots are indicated above the distance from ground axis for way points WPT 03 and WPT 07.

In this example, the aircraft is represented in the form of a cross surrounded by a circle, with which is associated an arrow indicating its instantaneous gradient.

It should be noted that when the display of a constraint by means of the previously described symbols cannot be realized due to the scale selected for the altitude, this constraint is then indicated by a symbol such as an arrow.

In this case, no indication specifies the type or value of this constraint.

The flight management system is of course designed to check in-flight compliance with the constraints marked out along the flight plan. This being valid both for the previously mentioned constraints and for the ones that will be subsequently described in the description.

In the case of one of the constraints not being complied with, the flight management system will transmit a warning message to inform the pilot. Thus, for instance, the symbols used to indicate the constraints can take on two separate colours, depending on whether or not the constraint is complied with. A colour corresponding to the conventionally adopted colour for the transmission of information (green or magenta) when the constraint is complied with, and a colour reserved for warning messages (e.g. amber) in the case of the constraint not being complied with.

In the latter case, the display of the constraint can be presented in a flashing manner to incite the pilot to take action with a view to complying with this constraint.

Figure 6:
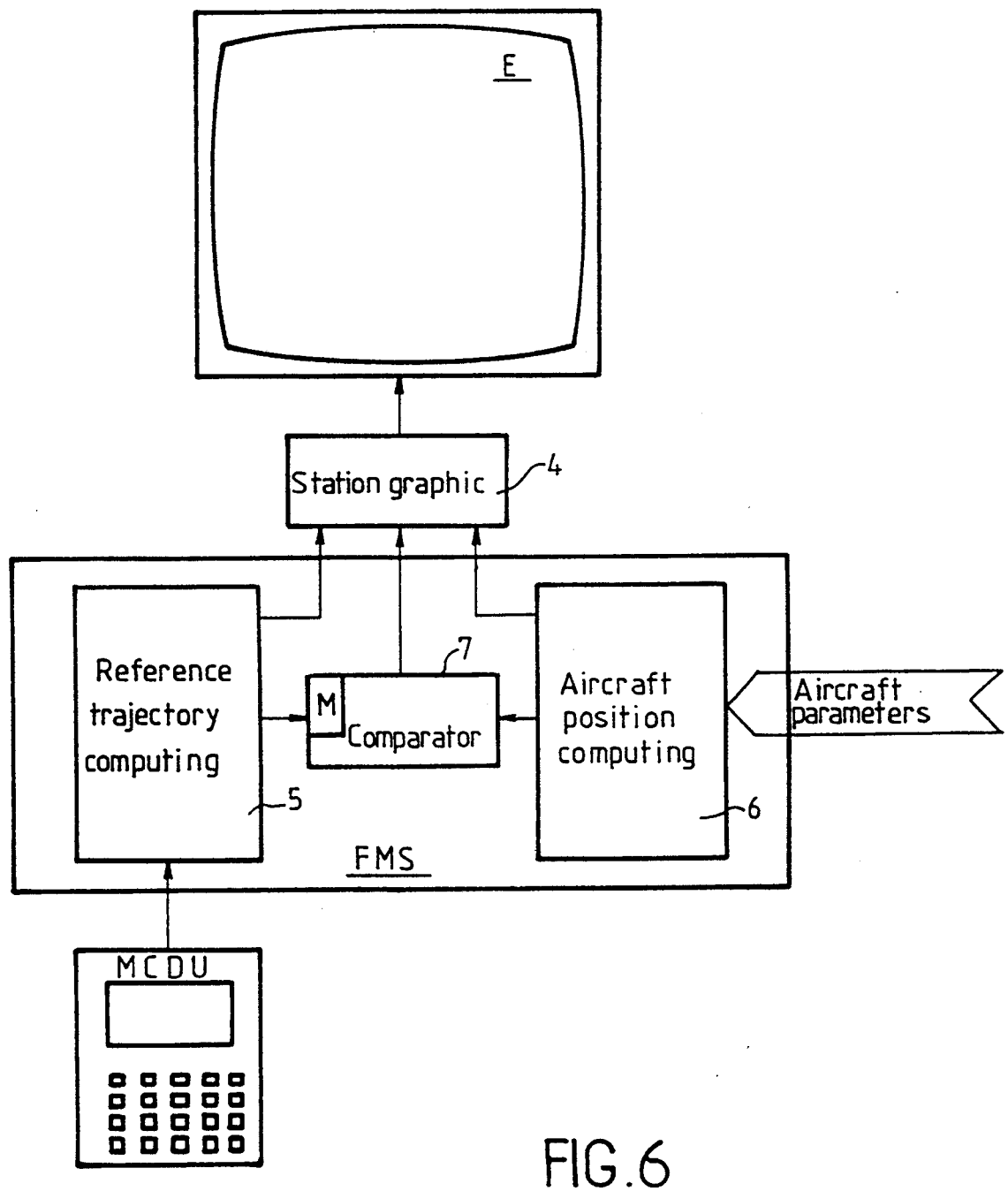
FIG. 6 is a synoptic diagram of the means used to implement the method embodying the invention.

In the example represented in FIG. 6, the screen E on which is represented the trajectory of the aircraft is coupled to a flight management system FMS of which the keyboard/screen console (MCDU) constitutes the element of dialogue with the pilot. The trajectory generated by the computer is displayed on the screen E by means of a screen management circuit 4 ("Station Graphic").

This computer FMS comprises means 5 for generating the information necessary for enabling the line of the vertical trajectory of the aircraft to be produced on the screen E from information entered by the pilot on the keyboard of the MCDU, and aircraft position computing means 6 enabling real-time display on the screen E of a symbol indicating the position of the aircraft in relation to the above-mentioned trajectory.

This position of the aircraft is determined from aircraft parameters available on board the aircraft, such as altitude, air speed, time, geographical position, etc.

The parameters relating to the constraints associated with the flight plan displayed on screen E and which come from the picture generator 5 are memorized in a memory M with a view to real-time comparison in a comparator 7 with the corresponding parameters of the aircraft computed by the computer 6.

This comparator 7 is designed so as to arrange, should the comparison reveal that a constraint has not been complied with, for it to cause display on the screen of a warning signal enabling identification of the symbol representing the constraint which has not been complied with.

I claim:

1. A method for assistance in piloting an aerodyne, said method comprising the steps of displaying a theoretical reference vertical profile of a flight plan of said aerodyne on a screen in a pilot's cockpit of said aerodyne of an altitude/ground distance reference system having a horizontal ground distance axis and a vertical altitude axis, said vertical profile comprising a succession of way points, each of which is identifiable by an altitude on the vertical axis and a ground distance on the horizontal axis, each of said succession of way points being connected together by connecting lines to constitute said profile, displaying with said vertical profile an altitude constraint information signal comprising at least three altitude constraint symbols:

a first symbol of said symbols provided on a vertical line running through a first way point of said succession said first symbol being located above said first way point so as to indicate a maximum altitude at which the aerodyne can pass, when said aerodyne passes through said first vertical line, a second symbol of said symbols provided on a second vertical line running through a second way point of said succession, said second symbol being located below said second way point so as to indicate a minimum altitude at which the aerodyne can pass when said aerodyne passes through said second vertical line, and a third symbol of said symbols provided on a third vertical line running through a third way point of said succession, said third symbol pointing to said third way point so as to indicate an altitude range at which the aerodyne should pass, when said aerodyne passes through said third vertical line, displaying with said vertical profile a first speed information signal with at least one way point, said first speed information signal respectively indicating a speed value at or under which the aerodyne is required to fly and a predicted speed value of the aerodyne, displaying with said vertical profile a mark which represents an instantaneous position of the aerodyne with respect to said profile, said mark being displayed with a second speed information signal indicating an actual speed value of the aerodyne and a value of a next speed at or under which the aerodyne is required to fly, and displaying a warning message when the aerodyne exceeds an altitude or speed respectively set by any of the three constraint symbols, first speed information signal or second speed information signal along with the symbol or signal actuating the warning signal.

2. The method as claimed in claim 1 further comprising the step of displaying designation information for each way point, said designation information being located on said screen adjacent to the vertical line passing through said way point and to said ground distance axis.

3. The method as claimed in claim 1 further comprising the step of displaying on the profile at least one symbol indicating a speed change.

4. The method as claimed in claim 2, wherein a time of passage is associated with said way point designation information.

5. The method as claimed in claim 1, further comprising the step of displaying in terminal zones of said profile a symbol indicating a presence of a gradient wind speed.

6. The method as claimed in claim 1, further comprising the step of displaying a ground relief in said terminal zones (takeoff, approach) of said profile.

7. The method as claimed in claim 1, wherein said warning message consists in a change of colour of the display.

8. The method as claimed in claim 1 wherein said warning message comprises a flashing of the display.

* * * * *